March 28, 1961   A. G. McNEILL   2,976,767
AUXILIARY SPECTACLES
Filed May 26, 1958
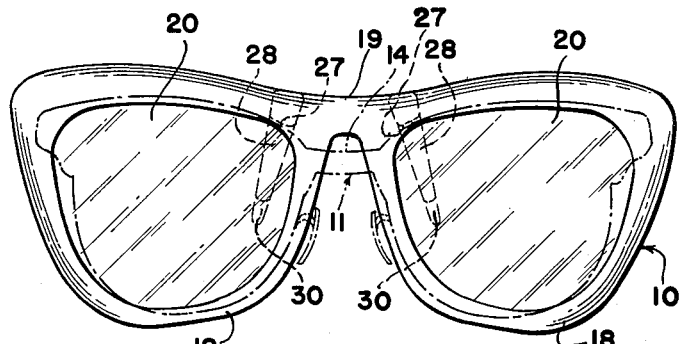
FIG. 1
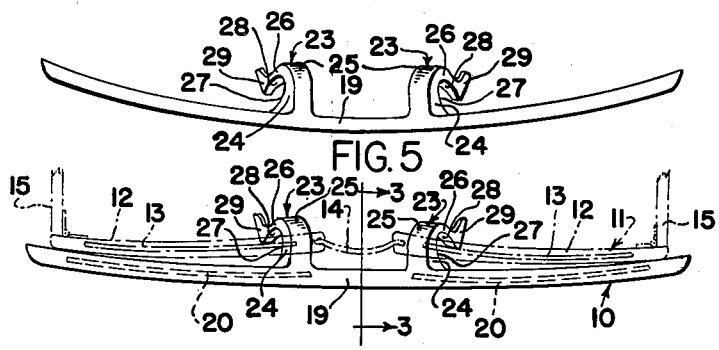
FIG. 5
FIG. 2
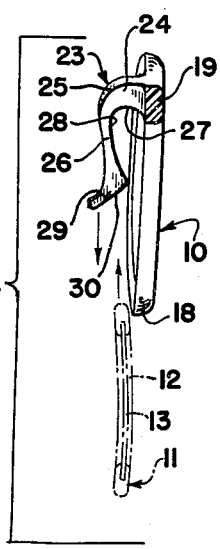
FIG. 4
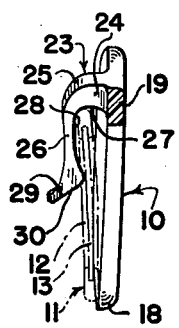
FIG. 3
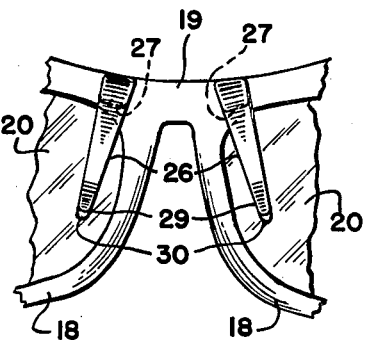
FIG. 6
INVENTOR.
ALBERT G. McNEILL
BY
*Robertson and Yautes*
ATTORNEYS United States Patent Office 2,976,767
Patented Mar. 28, 1961

2,976,767
AUXILIARY SPECTACLES

Albert G. McNeill, Maple Glen, Pa., assignor to Bachmann Bros., Inc., Philadelphia, Pa., a corporation of Pennsylvania Filed May 26, 1958, Ser. No. 737,956
2 Claims. (Cl. 88—41)

This invention relates generally to ophthalmic appliances, and is especially concerned with auxiliary or secondary spectacles for use with primary spectacles.

While the appliance of the present invention has been primarily developed and employed for use as a sun shade or sun glasses, and is illustrated and described hereinafter with particular reference theerto, it is appreciated that the device is capable of other and varied applications, all of which are intended to be comprehended herein.

As is well known to those versed in the art, a common type of prior auxiliary spectacles was that having a pair of lens loops connected together by a spring strip resiliently biasing the loops toward each other, and having hooks on the laterally outward regions of the loops for engagement about the laterally outward regions of the primary spectacles. This form of prior art device was not entirely satisfactory, for many reasons, including the difficulty in applying and removing the auxiliary spectacles, the need for frequent adjustment of hooks, and the limited range of use of a particular auxiliary spectacle with primary spectacles of different designs.

Another conventional auxiliary spectacle is that having a rigid frame and carrying on its bridge a spring-biased clamping mechanism engageable behind the primary spectacles to hold the frame of the auxiliary spectacles against the primary spectacles. This type of prior art device requires an excessive number of parts, especially in the spring-biased clamping mechanism, adding considerably to cost and weight. Further, the clamping mechanism is relatively bulky and unsightly, necessarily bearing against the nose of the wearer if it is not to project too far forward, so as to be uncomfortable both physically and visually. The spring-biased clamp-type auxiliary spectacles also suffer from lack of versatility in being incapable of use with many of the presently popular styles of primary spectacles, such as those having heavy frames or provided with projecting ornamentation.

It is therefore one object of the present invention to provide an auxiliary spectacle of the type described which overcomes the above-mentioned disadvantages of the prior art devices, is extremely simple in construction, and light in weight, and which snugly and firmly fits substantially all types of primary eyeglasses, including rimless and heavy frames carrying ornamental projections.

It is a further object of the present invention to provide an auxiliary spectacle construction having the advantageous characteristics mentioned in the preceding paragraph, which is neat and attractive in appearance, having no clamping mechanism or hooks exposed to mar the desired aesthetic appearance or become defective in operation, and which is extremely easily applied to and removed from primary spectacles.

It is still another object of the present invention to provide auxiliary spectacles of the type described which are extremely durable and long-lasting in use, and which can be economically manufactured and sold.

Other objects of the present invention will become apparent upon reading the following specifications and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

Figure 1 is a front elevational view showing the auxiliary spectacles of the present invention, and illustrating in dot-and-dash outline primary spectacles in operative association with the auxiliary spectacles;

Figure 2 is a top plan view showing the associated primary and secondary spectacles of Figure 1;

Figure 3 is a transverse sectional view taken substantially along the line 3—3 of Figure 2;

Figure 4 is a view similar to Figure 3, but exploded to show removal and replacement of the auxiliary spectacles with respect to the primary spectacles;

Figure 5 is a top plan view of the instant auxiliary spectacles apart from the primary spectacles; and Figure 6 is a partial, rear elevational view of the instant auxiliary spectacles.

Referring now more particularly to the drawings, and particularly to Figures 1 and 2 thereof, the auxiliary spectacles are there generally designated 10, while the primary spectacles are there generally designated 11. The primary spectacles 11 may be of any conventional type, being illustrated as including a pair of laterally spaced, side by side lens loops 12, each having a lens 13 received therein, and connected together by a bridge 14 extending between the adjacent upper regions of the lens loops. Side pieces or temples 15 may be hinged to the laterally outer portions of the lens loops 12. For simplicity of terminology, the lens loops 12 and bridge 14 will be hereinafter referred to as the frame of the primary spectacles.

The auxiliary spectacles of the instant invention, generally designated 10, include a pair of laterally spaced, side by side annular members or lens loops 18, and a bridge 19 extending between the adjacent upper regions of the loops 18. The auxiliary spectacle loops 18 and bridge 19 will be hereinafter called the frame of the auxiliary spectacles.

In practice, it is preferred to fabricate the loops 18 and connecting bridge 19 integrally of plastic, as by injection moulding, selecting material having suitable resiliently yieldable characteristics, such as polyethylene. By the use of such material, lenses 20 may be respectively engaged in the loops 18 by elastic distention of the latter, without permanent deformation, heating or the like.

The inclusion of lenses 20 in the loops 18, of course, adds a measure of rigidity to the loops. As best seen in Figures 3 and 4, the bridge 19 may be of generally rectangular cross-sectional configuration, and is preferably vertically elongate in cross section. That is, the vertical dimension or height of the bridge 19 is advantageously greater than the forward and rearward dimension or thickness. More specifically, the vertical dimension or height is preferably sufficient to make the bridge relatively stiff or resistant to bending about a forwardly and rearwardly extending, generally horizontal axis, while the forward and rearward dimension or thickness is smaller so that the bridge 19 may be more easily resiliently flexed about a vertical axis, to enable relative angular displacement of the lens loops about such vertical axis. In its unstressed or undistorted condition, the frame 18, 19 of the auxiliary spectacles 10 has a slight curvature, as seen in the plan view of Figure 5. By this curvature, the loops 18 may be considered as normally disposed in slight angular relationship with respect to each other, being divergent rearwardly in the undistorted condition of the frame and especially in the undistorted condition of the bridge 19.

On the rearward side of the auxiliary spectacle frame 18, 19, projecting rearward therefrom adjacent to opposite ends of the bridge, are a pair of laterally spaced engagement members or hooks, each generally designated 23. The hooks 23 are advantageously fabricated of resiliently yieldable material, such as polyethylene plastic, and are preferably formed integral with the frame 18, 19, but may be separately formed and easily secured to the frame, if desired. The engagement members or hooks 23 are substantially identical, so that a detailed description of one will suffice.

Each of the engagement members or hooks 23 includes a relatively thick upper portion 24 which projects rearward from the rear side of the frame 18, 19, adjacent to a respective end of the frame bridge. The rearward end portion of the upper hook portion 24 curves smoothly downward, as at 25, merging into a depending rearward hook portion 26 spaced rearward behind the auxiliary frame. As best seen in Figures 4 and 5, the inner or under edge 27 of the upper hook portion 24, and the inner or forward edge 28 of the rearward hook portion 26 combine to define a smoothly curving edge, with the edge 28 curving slightly downward and forward toward the adjacent lens 20. The lower end of the rearward hook portion 26 is provided with an enlargement or extension 29 which projects rearward and downward, and has its under edge or surface 30, the distal end surface of the hook 23, normally disposed in downward and rearward slanting relationship.

In Figures 1 and 6, it may be best seen that each of the hooks 23 tapers in its lateral dimension or width in the direction from the upper portion 24 toward the lower end edge 30; and also, that the hooks 23 each depend in a laterally outwardly inclined relation. Stated otherwise, the hooks 23 diverge from each other in a downward direction, each being located directly behind a laterally inner region of a respective loop 18 and lens 20.

In order to place or apply the auxiliary spectacles 10 on the primary spectacles 11, it is only necessary to move the auxiliary and primary spectacles relative to each other, as indicated by the arrows in Figure 4. The upper edge of the primary spectacle loops 12 will engage with the under or distal end edge 30 of the hooks 23, and by the rearward and downward inclination of the latter, as well as by the resilience of the hooks, the hooks will be elastically distorted rearward for engagement over the loops 12. This condition is seen in Figure 3, wherein the lower or distal end portion 29 of each hook 23 has snapped into retaining engagement with the adjacent primary lens 13, with the upper regions of the primary loops 12 received closely beneath the upper hook portions 24. As is obvious from Figure 3, primary spectacle frames of widely varying sizes and shapes may be engaged beneath the upper hook portions 24, with the lower or distal end portions 29 of the hooks 23 in firm resiliently retaining engagement with the primary spectacles lenses.

In addition, as best seen in Figure 2, the curvature of the auxiliary spectacles frame 19, as seen in the plan view of Figure 2, has been reduced by its positioning on the primary spectacles 11. That is, the initial or undistorted curvature of the auxiliary spectacles, as seen in Figure 5, is greater than that of primary spectacles, so that engagement of the auxiliary spectacles in facing relation with the forward side of the primary spectacles, and retention on the latter by the hooks 23 located medially of the auxiliary spectacles, serves to draw the medial portion of the auxiliary spectacles inward or rearward, and thereby reduce total curvature of the auxiliary spectacles. Further, upon the relative movement of auxiliary and primary spectacles indicated in Figure 4, the outer side portions of the loops 18 will engage with the primary spectacles to be distorted forward relative to the medial portion of the auxiliary spectacles, for smooth and easy placement of the auxiliary spectacles on the primary spectacles. It will be appreciated that the major straightening or reduction of curvature in the frame 18, 19 occurs by bending of the bridge 19 about a vertical axis, and that the desired amount of such bending may be accomplished, as is required by the contours of the primary spectacles 11. In particular, it will now be appreciated that the auxiliary spectacles may be advantageously employed in position on primary spectacles having various projecting ornamentation, as is currently popular in ladies' fashions.

From the foregoing, it is seen that the present invention provides an auxiliary spectacle which fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1 Auxiliary spectacles for attachment to primary spectacles, said auxiliary spectacles comprising a frame including a pair of laterally spaced lens loops and a bridge extending between the adjacent upper regions of said loops, said loops and bridge being integrally fabricated solely from soft resiliently yieldable material, said lens loops being normally disposed in rearwardly diverging relationship with said bridge in undistorted condition and being displaceable into substantial coplanarity upon resilient deflection of said bridge, and a pair of laterally spaced hooks on said frame adjacent to opposite ends of said bridge, said hooks being integral with and formed as a single unit with said frame and fabricated of soft resiliently yieldable material, each of said hooks including an upper portion extending rearwardly from said frame and a rearward portion depending from said upper portion spaced rearward from the adjacent loop, each of said rearward portions having a downwardly and rearwardly obliquely extending lower edge, said lower edges terminating at their lower ends spaced rearward beyond the rearwardmost region of said frame in a horizontal plane through said lower ends, for cam engagement over said lower edges over primary spectacles upon flexing and downward movement of said auxiliary spectacles.

2. Auxiliary spectacles according to claim 1, said lens loops, bridge and hooks all being integrally and entirely fabricated of polyethylene.

References Cited in the file of this patent

UNITED STATES PATENTS

| 852,599 | Dripps | May 7, 1907 |
| 1,558,715 | Strauss | Oct. 27, 1925 |
| 1,709,195 | Shindel | Apr. 16, 1929 |
| 2,516,764 | Chlert et al. | July 25, 1950 |
| 2,602,372 | Passet | July 8, 1952 |
| 2,758,506 | McNeill | Aug. 14, 1956 |

FOREIGN PATENTS

| 466,034 | Great Britain | May 20, 1937 |
| 1,087,669 | France | Aug. 25, 1954 |
| 541,522 | Canada | May 28, 1957 |